US008723878B2

(12) United States Patent
Bae et al.

(10) Patent No.: US 8,723,878 B2
(45) Date of Patent: May 13, 2014

(54) DISPLAY DEVICE INTEGRATED CIRCUIT (DDI) WITH ADAPTIVE MEMORY CONTROL AND ADAPTIVE MEMORY CONTROL METHOD FOR DDI

(75) Inventors: Jongkon Bae, Seoul (KR); Kyuyoung Chung, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1640 days.

(21) Appl. No.: 11/716,044

(22) Filed: Mar. 9, 2007

(65) Prior Publication Data

US 2008/0049038 A1 Feb. 28, 2008

(30) Foreign Application Priority Data

Aug. 25, 2006 (KR) ........................ 10-2006-0081171

(51) Int. Cl.
*G06F 12/06* (2006.01)

(52) U.S. Cl.
USPC ........... 345/573; 345/562; 345/531; 345/567; 345/551; 345/100; 345/571; 345/467; 345/519; 365/189.15; 365/182; 365/184; 365/230.05; 365/203; 365/149; 365/231; 365/200; 711/206; 711/108; 714/7; 714/804; 714/785; 714/8; 714/718; 714/719; 714/5

(58) Field of Classification Search
USPC ......... 345/561–563, 564–574, 531, 551, 100, 345/467, 519; 711/100–173, 200–221; 365/189.15, 182, 184, 230.05, 203, 365/149, 231, 200; 714/7, 804, 785, 8, 733, 714/718, 719, 5
See application file for complete search history.

(56) References Cited

U.S. PATENT DOCUMENTS

| | | | | |
|---|---|---|---|---|
| 4,903,217 | A * | 2/1990 | Gupta et al. | 345/545 |
| 5,065,447 | A * | 11/1991 | Barnsley et al. | 382/249 |
| 5,509,129 | A * | 4/1996 | Guttag et al. | 712/203 |
| 5,680,161 | A * | 10/1997 | Lehman et al. | 345/531 |
| 5,877,780 | A * | 3/1999 | Lu et al. | 345/519 |
| 5,881,006 | A * | 3/1999 | Yabe et al. | 365/207 |
| 5,966,116 | A * | 10/1999 | Wakeland | 345/658 |
| 6,023,745 | A * | 2/2000 | Lu | 711/5 |
| 6,230,235 | B1 * | 5/2001 | Lu et al. | 711/106 |
| 6,282,603 | B1 * | 8/2001 | Rao | 711/5 |
| 6,400,851 | B1 * | 6/2002 | Shih | 382/297 |
| 6,453,332 | B1 * | 9/2002 | Shyu | 708/607 |
| 6,754,746 | B1 * | 6/2004 | Leung et al. | 710/100 |
| 6,757,447 | B2 * | 6/2004 | Yamaguchi et al. | 382/293 |
| 6,873,320 | B2 * | 3/2005 | Nakamura | 345/204 |
| 7,050,071 | B2 * | 5/2006 | Wyatt et al. | 345/649 |
| 7,307,635 | B1 * | 12/2007 | Yang et al. | 345/560 |
| 7,315,294 | B2 * | 1/2008 | Richards | 345/84 |
| 7,573,483 | B2 * | 8/2009 | Champion | 345/531 |
| 8,310,495 | B2 * | 11/2012 | Bae et al. | 345/568 |
| 2001/0043205 | A1 * | 11/2001 | Huang et al. | 345/204 |
| 2002/0105522 | A1 * | 8/2002 | Kolluru et al. | 345/519 |

(Continued)

*Primary Examiner* — Abderrahim Merouan
(74) *Attorney, Agent, or Firm* — Volentine & Whitt, PLLC

(57) ABSTRACT

A graphics memory device includes a memory array configured to store data for a display device comprising b*y rows by a*x columns of pixels, where b>a. The memory array is arranged in a*y rows by b*x columns of memory locations. Each memory location is adapted to store n-bit image data for one of the pixels of the display device. A memory location remapping circuit is adapted to map image data stored in the b*x columns of memory locations in the memory device to the a*x columns of the display device.

8 Claims, 6 Drawing Sheets

(56) References Cited

U.S. PATENT DOCUMENTS

| | | | | |
|---|---|---|---|---|
| 2003/0067434 | A1* | 4/2003 | Haga et al. | 345/98 |
| 2003/0105793 | A1* | 6/2003 | Guttag et al. | 708/625 |
| 2004/0202263 | A1* | 10/2004 | Choi | 375/354 |
| 2005/0012752 | A1* | 1/2005 | Karlov | 345/538 |
| 2005/0057479 | A1* | 3/2005 | Richards | 345/98 |
| 2005/0179616 | A1* | 8/2005 | Tsuji | 345/2.1 |
| 2005/0276088 | A1* | 12/2005 | Moon et al. | 365/63 |
| 2008/0012869 | A1* | 1/2008 | Poddar | 345/530 |

* cited by examiner

DISPLAY DEVICE INTEGRATED CIRCUIT (DDI) WITH ADAPTIVE MEMORY CONTROL AND ADAPTIVE MEMORY CONTROL METHOD FOR DDI

BACKGROUND AND SUMMARY

1. Field

This invention relates, in general, to display driver integrated circuits, and more particularly, to a display driver integrated circuit having a graphic random access memory (GRAM). The invention also related generally to memory control methods for display driver integrated circuits with GRAMs.

2. Description

Display driver integrated circuits (DDIs) are used to supply image data to pixels of display devices. Such a DDI may include a graphic RAM (GRAM). In one application, a DDI is used to drive an active matrix display device, for example an active matrix liquid crystal display (LCD) device. Such a display device typically includes a plurality of pixel elements arranged in rows and columns, with each pixel element including a field effect transistor (FET) as a pixel switching element. The gates of the FETs are all connected to corresponding gate lines (row lines) for receiving row selection signals, and the sources of the FETs are all connected to corresponding source lines (column lines) for receiving image data.

FIG. 1 illustrates an arrangement of GRAM cells 110 and source drivers 120 in a DDI 100 for supplying image data to a display device, such as an active matrix display device as described above. DDI 100 includes one source driver 120 for each column line of the display device to be driven by DDI 100. For example, in many display devices, three adjacent column lines of the display device drive three corresponding columns of sub-pixels for displaying three different colors (e.g., red, green & blue) to form pixels displaying an entire spectrum of colors. Meanwhile, three source drivers 120 are provided for the three column lines, supplying image data for the three colored sub-pixels forming each pixel. Moreover, as illustrated in FIG. 1, each column of GRAM cells 110 stores image data for three columns of sub-pixels in the display device. That is, each column of GRAM cells 110 provides image data to three source drivers 120—one for each of the three colors in a column of pixels.

As the degree of integration of the GRAM devices increases, the GRAM devices become smaller and smaller. However, in general, in today's technology a reduction in the width of GRAM cells 110 is not matched by a corresponding reduction in width of the source drivers 120. As a result, a column of GRAM cells 110 having a small width is disposed confronting three source drivers 120 whose combined width is greater than the width of the GRAM cells. In particular, under a 130 ns process, the size of the "face" of, e.g., three source drivers 120 is greater than the size of the corresponding "face" of GRAM cells 110.

So, a hardware design must consider how to interface the lines from GRAM cells 110 with the reduced width, to source drivers 120 having a greater width. This makes signal routing quite difficult, and leads to an increase in the area required for signal routing, as can be understood from FIG. 1. This is undesirable from the standpoint of the constant desire to reduce the overall size of DDI 100. Furthermore, there is a desire among the customers for DDIs for reduced chip height.

Accordingly, it would be advantageous to provide a DDI which can accommodate a reduction in the size of GRAM cells without an increase in the area required for signal routing. It would also be advantageous to provide a method of providing image data to source drivers for a display device which can operate without a large and difficult signal routing layout.

In one aspect of the invention, a method provides image data to source drivers for a display device comprising b*y rows and a*x columns of pixels, where b>a. The method comprises: receiving image data for b*y rows of pixels of the display device, the image data for each of the b*y rows of pixels including image data for each of the a*x columns of pixels of the display device; storing the image data for the b*y rows of pixels of the display device into a*y rows of memory cells in a graphics memory device, wherein each of the a*y rows of memory cells in the graphic memory device stores image data for an entire one of the b*y rows of pixels of the display device, and further stores image data for x columns of each of (b−a) other rows of pixels of the display device; and sequentially supplying the image data for each of the b*y rows of pixels of the display device from the graphic memory device to the source drivers.

In another aspect of the invention, a graphics memory device is adapted to provide image data to source drivers for a display device comprising b*y rows and a*x columns of pixels, where b>a. The device comprises: a memory array having a*y rows and b*x columns of memory cells, the memory array being adapted to store image data for b*y rows of pixels of the display device into the a*y rows of memory cells of the memory array, the image data for each of the b*y rows of pixels of the display device including image data for each of the a*x columns of pixels, wherein each of the a*y rows of memory cells of the memory array is adapted to store image data for an entire one of the b*y rows of pixels of the display device, and to store image data for x columns of each of (b−a) other of the b*y rows of pixels of the display device; and a memory location remapping circuit adapted to supply the image data for each of the b*y rows of pixels of the display device from the memory array to the source drivers.

In a further aspect of the invention, a graphics memory device comprises: a memory array configured to store data for a display device comprising b*y rows and a*x columns of pixels, where b>a, the memory array being arranged in a*y rows and b*x columns of memory locations, each memory location being adapted to store n-bit image data for one of the pixels of the display device; and a memory location remapping circuit adapted to remap image data stored in the b*x columns of memory locations in the memory array to the a*x columns of the display device.

In yet another aspect of the invention, a method of providing image data to source drivers of a display device comprising b*y rows and a*x columns of pixels, where b>a, comprises: storing n-bit image data for the pixels of the display device in a memory array arranged in a*y rows and b*x columns of memory locations, each memory location being adapted to store n-bit image data for one of the pixels; and remapping the image data stored in the b*x columns of memory locations in the memory device to the a*x columns of the display device.

In still another aspect of the invention, a method of providing image data to source drivers of a display device, comprises: receiving image data for blocks of b rows by a columns of pixels of a display device, where the image data is mapped to a rows by b columns; storing the mapped image data in blocks of a rows by b columns of memory locations in a memory array; and remapping the image data stored in the blocks of a rows by b columns of memory locations in a memory array, to the b rows by a columns of pixels of a display device, where b>a.

In a still further aspect of the invention, a graphics memory device comprises: a memory array configured to store image data for blocks of b rows by a columns of pixels of a display device in blocks of a rows by b columns of memory locations; and a memory location remapping circuit configured to remap the image data stored in the blocks of a rows by b columns of memory locations in a memory array, to the b rows by a columns of pixels of a display device, where b>a.

DETAILED DESCRIPTION

Figure 2:
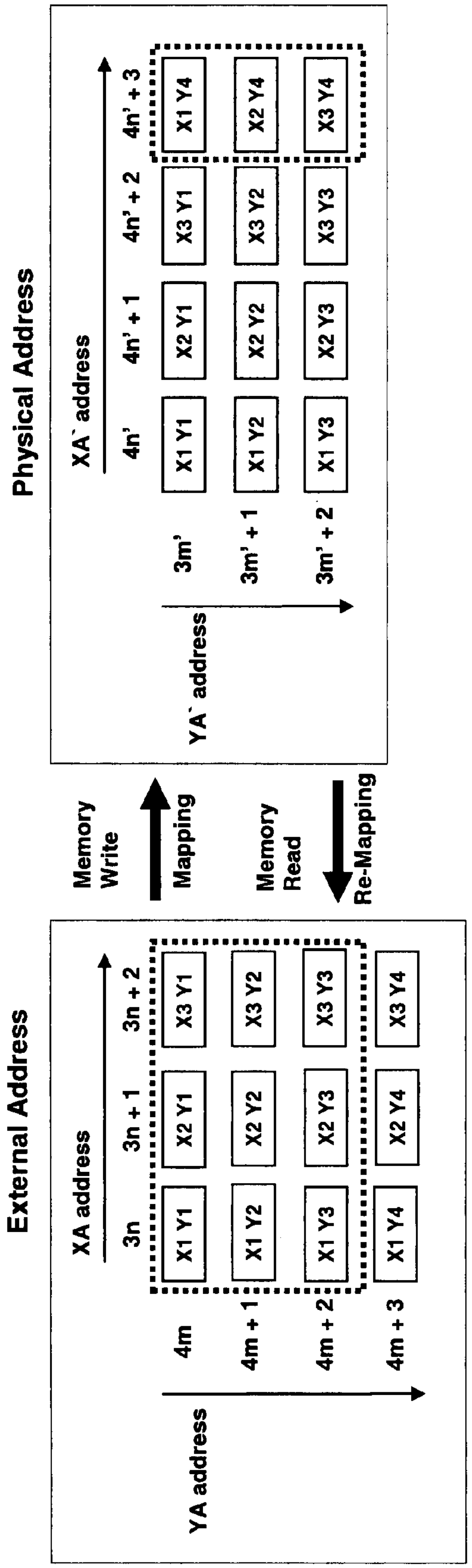
FIG. 2 conceptually illustrates one embodiment of a memory mapping scheme for a DDI.

FIG. 2 conceptually illustrates one embodiment of a memory mapping scheme for a display driver integrated circuit (DDI). In particular, FIG. 2 illustrates a memory mapping technique employed by a DDI to map externally used data addresses to physical memory addresses within a graphic random access memory (GRAM) included in the DDI.

In the memory mapping scheme illustrated in FIG. 2, it is assumed that the external addresses are provided in a matrix of b*y rows and a*x columns, which may correspond to a display device having b*y rows and a*x columns. The memory mapping scheme illustrated in FIG. 2 maps the b*y rows and a*x columns of external addresses into a*y rows and b*x columns of physical memory addresses of its GRAM.

In the example illustrated in FIG. 2, b=4, and a=3. For example only, and simply to illustrate the principles better, consider a case where y=60, and x=120. In that case, the external addresses are arranged in 4*60=240 rows and 3*120=360 columns. The memory mapping scheme illustrated in FIG. 2 maps the 4*60=240 rows and 3*120=360 columns of external addresses into 3*60=180 rows and 4*120=480 columns of physical memory addresses in the GRAM. That is, blocks of 3*4=12 external memory addresses are mapped into groups of 4*3 physical memory addresses, by taking the last of the four rows of external addresses and appending it to the last of the three columns to produce four columns of three addresses each of physical memory addresses. Using the numbers provided above, every $(4m+3)^{th}$ row of external addresses is relocated to a $(4n'+3)^{th}$ row of physical memory addresses, where m € (0, (y−1)) and n' € (0, x−1)), where y=60 and x=120.

Beneficially, the mapping and remapping schemes illustrated in FIG. 2 are performed whenever data is written into, or read out of, the GRAM in the DDI.

Figure 3A:
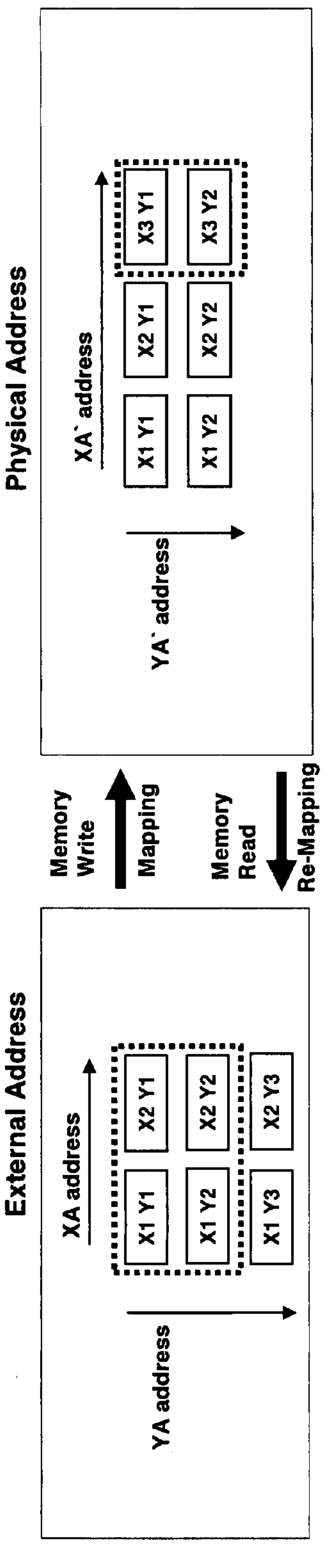
FIGS. 3A-B illustrate two different examples of a memory mapping scheme for a DDI.
Figure 3B:
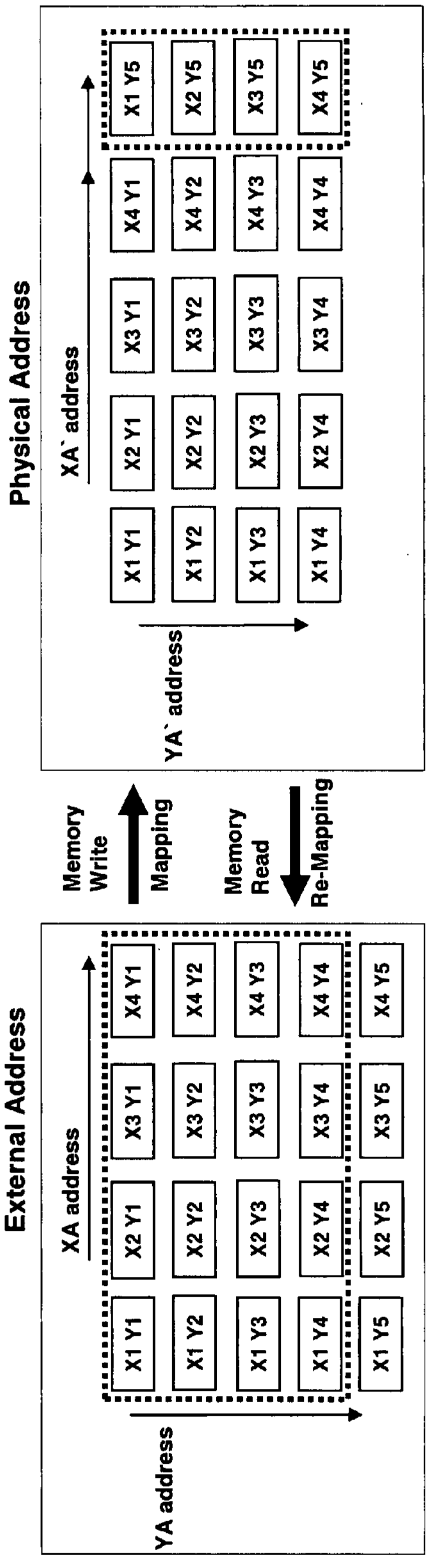

FIGS. 3A-B illustrate two different examples of a memory mapping scheme for a DDI. For ease of illustration, it is assumed that x=y=1, but the examples can easily be extrapolated for any values of x and y. In the first example of FIG. 3A, a block of b=3 rows by a=2 columns of external addresses are mapped to a block of a=2 rows by b=3 columns. In the second example of FIG. 3B, a block of b=5 rows by a=4 columns of external addresses are mapped to a block of a=4 rows by b=5 columns of physical memory addresses. The examples shown in FIGS. 3A-B illustrate how any block of (N+1) rows by N columns of external addresses can be transformed into N columns by (N+1) rows of physical memory addresses in GRAM. Advantageously, such a transformation changes the "aspect ratio" of the GRAM without a corresponding increase in its total size. That is, through the transformation achieved by the mapping scheme described above, the width of the GRAM is increased, while the depth is correspondingly decreased. Accordingly, for a same-size GRAM, the width of the GRAM can be made to better match the corresponding dimensions of the source drivers, thus facilitating signal routing and improving the overall layout. This will be shown and explained in greater detail below with respect to FIG. 5.

It should also be understood that although the examples shown in FIGS. 3A-B illustrate cases where the blocks of external addresses are (N+1) rows by N columns, the principles can be generally extended to a case where the blocks of external addresses comprise (N+j) rows by N columns, where j is an integer greater than or equal to 1.

Figure 4:
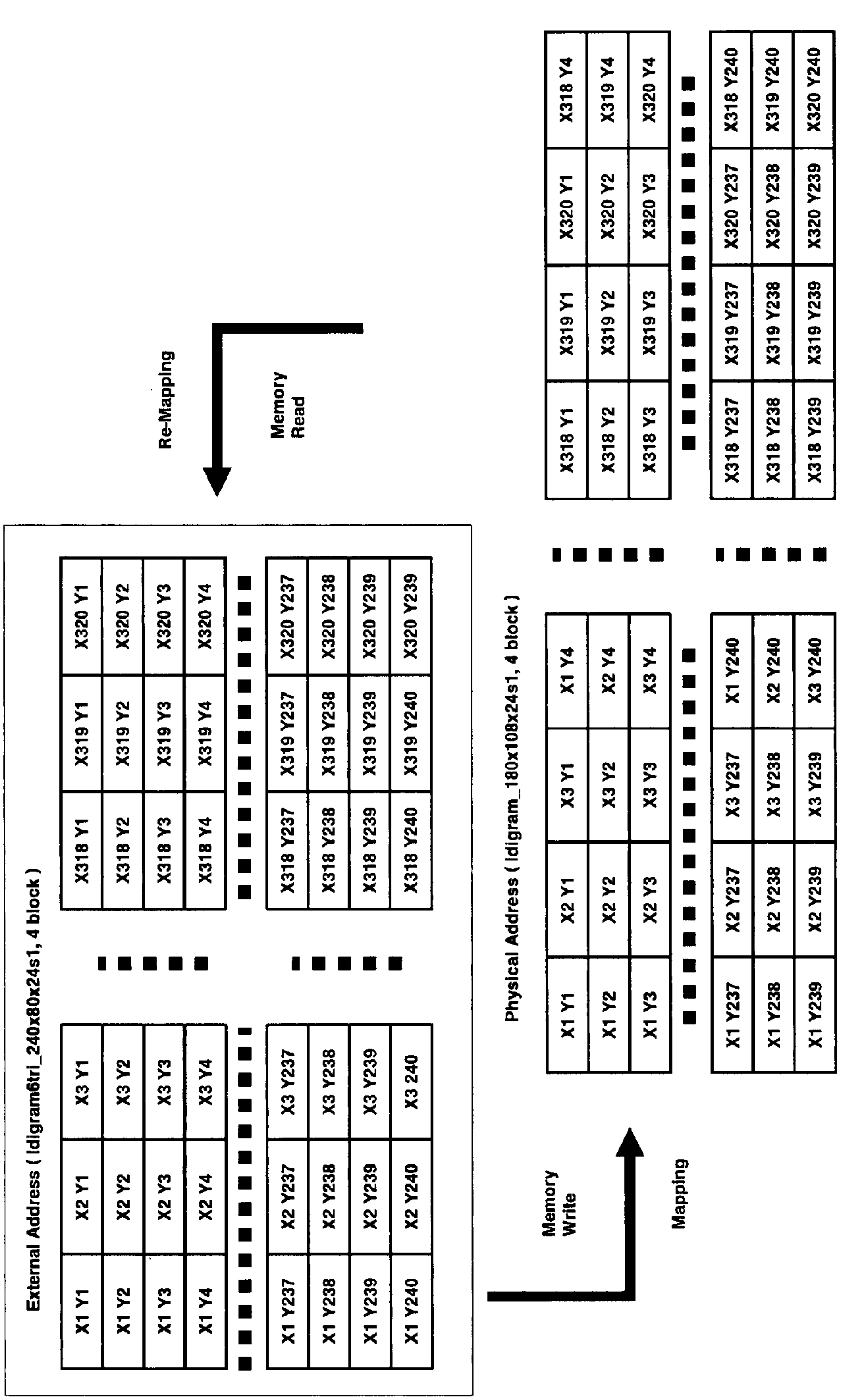
FIG. 4 illustrates one embodiment of a memory mapping scheme, and a corresponding memory remapping scheme, for a DDI.

FIG. 4 illustrates one embodiment of a memory mapping scheme, and a corresponding memory remapping scheme, for a DDI where there are a relatively large number of memory locations. Here, there are b*y=4*60=240 rows and a*x=3*120=360 columns of external addresses. In the mapping operation (e.g., a data write operation), as shown in FIG. 4, every group of b×a external addresses is mapped to a group of a×b physical memory addresses, where in the example of FIG. 4, b=4 and a=3. As a result, the physical memory (e.g., the GRAM) is arranged into a*y=3*60=180 rows and b*x=4*120=480 columns of physical memory addresses. Conversely, in the remapping operation (e.g., a data read operation), the a*y=3*60=180 rows and b*x=4*120=480 columns of physical memory addresses are remapped to b*y=4*60=240 rows and a*x=3*120=360 columns of external addresses.

Another way of understanding FIG. 4 is to consider that each of the a*y rows of physical memory addresses includes one entire row among the original b*y rows of the external memory addresses. Now, since b>a, there are (b−a)*y "extra" rows of external addresses that need to be stored in somewhere in the a*y rows of physical memory addresses. Therefore, each of the a*y rows of physical memory addresses also includes addresses corresponding to a fraction of another row of the external addresses. In particular, each of the a*y rows of physical memory addresses also includes x addresses from one of the "extra" rows of the external addresses. Since there are a total of a*x addresses in each row of external addresses, it can be seen that each one of the (b−a)*y "extra" rows of external addresses is included within each group of a consecutive rows of physical memory addresses.

For example, in the specific example shown in FIG. 4, a=3, x=120, b=4, and y=60. In that case, the external addresses include b*y=240 rows and a*x=360 columns. In turn, the physical memory addresses include a*y=180 rows, corresponding to 180 of the 240 rows of the external addresses. The remaining "extra" 60 rows of the external addresses are then included within the 180 rows of physical memory addresses, by including in each of the 180 rows of physical memory addresses, x=120 addresses of one of the "extra" rows. In particular, after every group of a=3 addresses in each row of physical memory addresses, a new address is inserted from one of the "extra" rows of external addresses. Therefore, a total of x=120 extra addresses from one "extra" row of external addresses are included in each row of physical memory addresses. Accordingly, each row of physical memory addresses has a total of the entire 360 addresses of one entire row of external memory addresses, plus another 120 addresses from an "extra" row of external addresses, resulting in a total of 480 addresses.

A memory controller may be employed to map the external addresses to the physical memory addresses of the GRAM in the DDI. Such a controller may be provided "on-board" to the DDI, or externally thereto.

Figure 5:
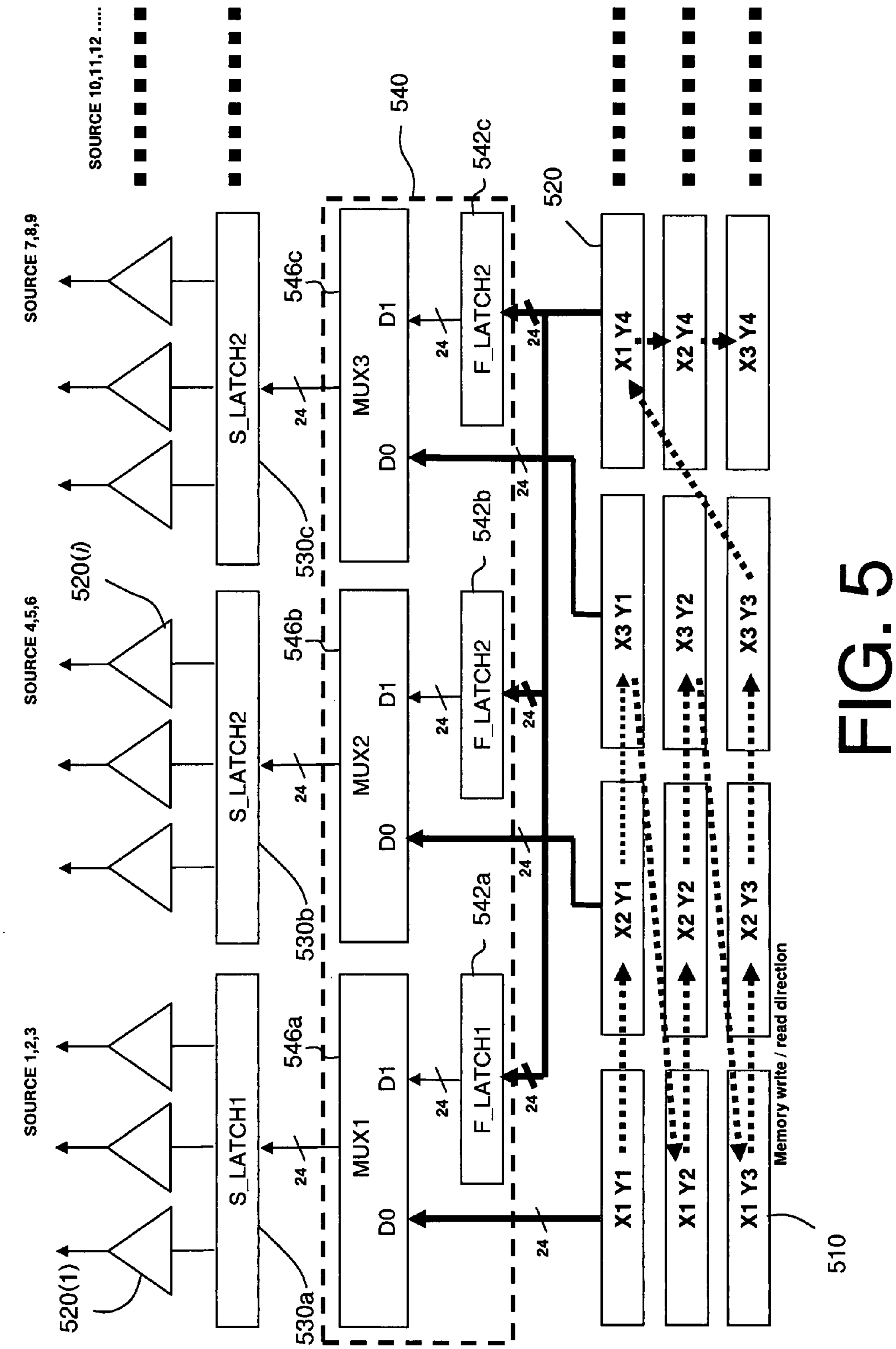
FIG. 5 illustrates one embodiment of an arrangement for remapping the physical addresses of GRAM cells in a DDI to the external addresses of source drivers in the DDI.

FIG. 5 illustrates one embodiment of an arrangement for remapping the physical addresses of GRAM cells 510 in a DDI to the external addresses of source drivers 520 in the DDI. FIG. 5 illustrates a plurality of GRAM cells 510 arranged in rows and columns, a plurality of source drivers 520(*i*), a plurality of source driver latches 530*a*-530*c*, and a memory location mapping circuit 540, where $i \in (1, 12)$. Memory location mapping circuit 540 includes a plurality of first latches 542*a*-542*b*, and a plurality of multiplexers (MUXs) 546*a*-546*c*.

In the example of FIG. 5, it is assumed that each GRAM cell 510 stores 24 bits of data for three source drivers 520, e.g., 8-bit image data for each of three column lines (e.g., source lines) of a display device, such as an active matrix LCD device, driven by source drivers 520. In turn, the three column lines drive three columns of sub-pixels of three different colors (e.g., red, green & blue) to form a column of pixels each comprising, for example, one red sub-pixel, one green sub-pixel, and one blue sub-pixel, for displaying an entire range of colors. Typically, the columns of sub-pixels are arranged in rows, with a switching terminal of each sub-pixel element in a row being connected to a corresponding row line or select line (e.g., a gate line). In that case, typically the rows of sub-pixels are selected sequentially one at a time during a row (or scan line) period by applying a selection or scanning voltage to the row line. Of course, the arrangement of three-sub-pixels into a single pixel is only exemplary, a pixel may have more or less than three sub-pixels.

Figure 1:
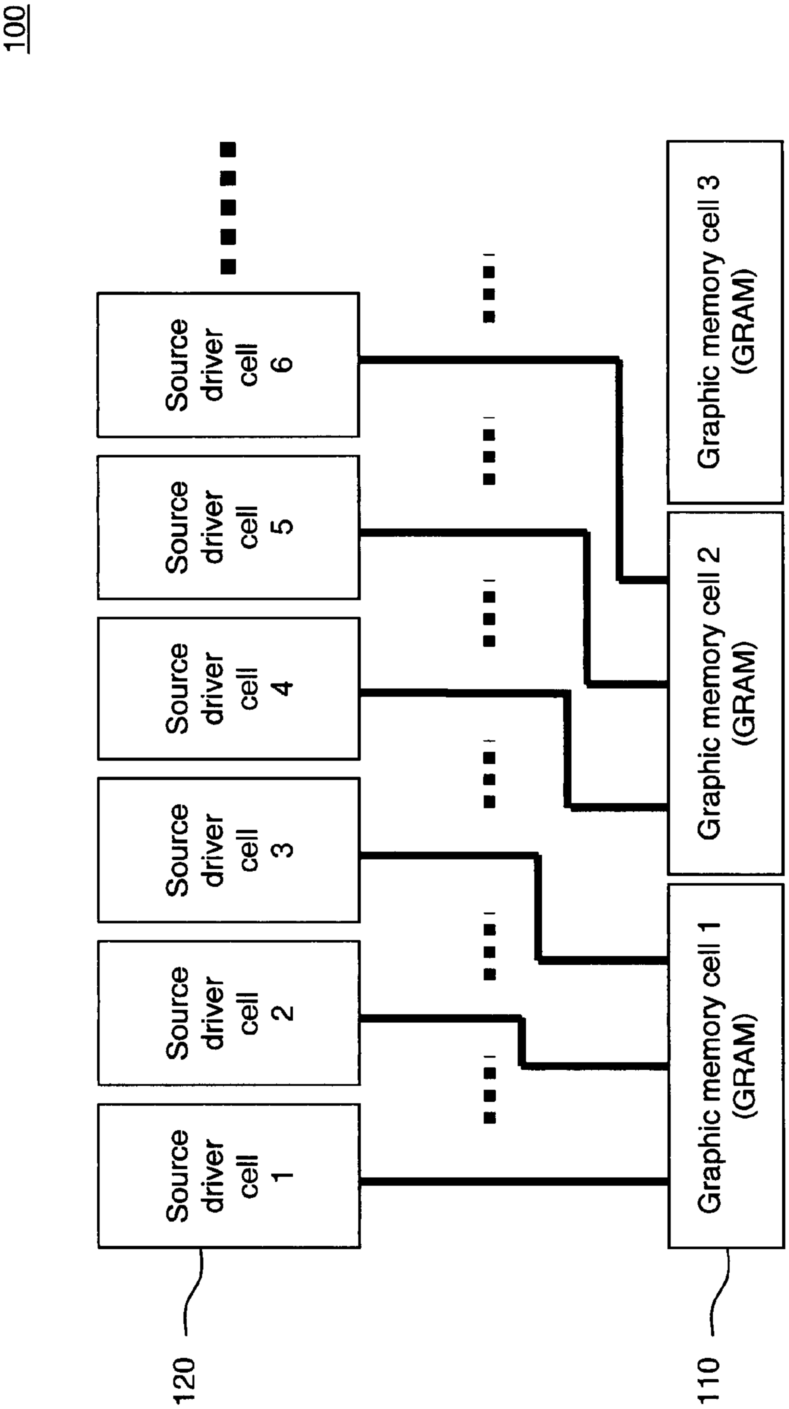
FIG. 1 illustrates an arrangement of graphic random access memory (GRAM) cells and source drivers in a driver integrated circuit (DDI) for a display device.

In the arrangement of FIG. 5 four (4) columns of GRAM cells 510 store data for nine (9) source drivers 520 for driving nine (9) column lines corresponding to three columns of pixels of a display device, and the four columns of GRAM cells 510 have to be interfaced to the nine (9) source drivers 520. In contrast, in the arrangement of FIG. 1, four (4) columns of GRAM cells 110 store data for twelve (12) source drivers 120 for driving twelve (12) column lines corresponding to fours columns of pixels of a display device, and the four GRAM cells 510 have to be interfaced to the twelve (12) source drivers 520. So as the widths of the GRAM cells 510 are reduced, the arrangement of FIG. 5 better matches the widths of the GRAM cells to the widths of the source drivers in comparison to the arrangement of FIG. 1. This makes signal routing easier, and leads to a decrease in the area required for signal routing compared to the arrangement of FIG. 1. At the same time, the total size occupied by the GRAM device is not increased by the arrangement of FIG. 5, because even though each row of memory cells 510 in the GRAM is longer (has more cells), the number of rows is correspondingly decreased to maintain an essentially uniform total size.

In FIG. 5, image data for source nine source drivers 520 has been mapped into four columns of GRAM cells 510. That is, as a result of the mapping operation as described above, externally supplied image data for b*y rows by a*x columns of pixels has been mapped to a*y rows by b*x columns of GRAM cells 510 in the DDI, where b=4, and a=3. Accordingly, memory location remapping circuit 540 remaps the image data stored in the GRAM cells 510 to be output properly to source drivers 520 and thereby to the column lines (source lines) of a display device to be driven. In particular, memory remapping circuit 540 remaps a*y rows by b*x columns of image data in GRAM 510 to b*y rows by a*x columns of pixels. In the particular embodiment of FIG. 5, memory remapping circuit 540 remaps blocks of image data from a=3 rows by b=4 columns of GRAM cells 510 to be output as b=4 rows by a=3 columns of image data for source drivers 520.

The operation of the exemplary embodiment memory remapping circuit 540 will now be explained with reference to the timing diagram of FIG. 6. In particular, the image data of three (3) rows of GRAM cells 510 each having four (4) GRAM cells 510, is remapped to four rows or lines of image data each comprising three columns of image data for three pixels per row.

Figure 6:
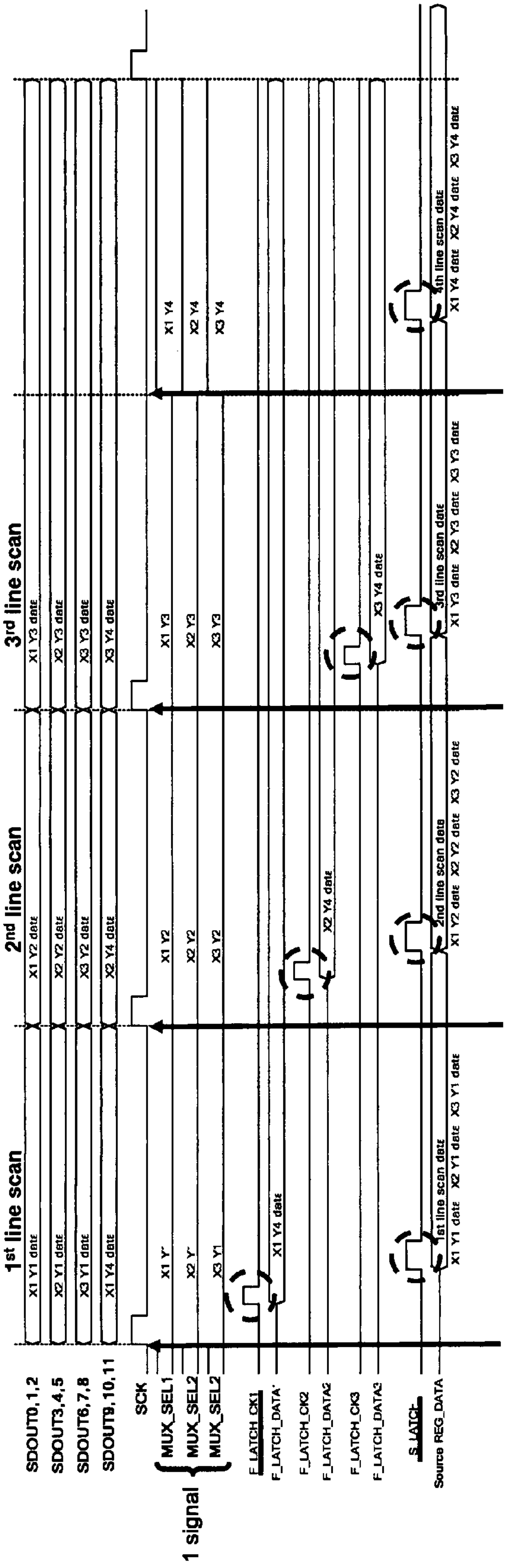
FIG. 6 shows a timing diagram for a memory location remapping circuit in a DDI.

As shown in FIG. 6, a scan clock SCK operates at a scan line rate at which a line or row of data is to be provided to source drivers 520. During a first scan line (or row) period, data in the first row of GRAM cells 510 is output by the GRAM device. In response to a MUX_SELECT signal (not shown in FIG. 5) and the rising edge of SCK, each of MUXs 546*a*-546*c* selects the image data input on line D0 from one of the first three columns of GRAM cells 510 and provides the selected data to a corresponding one of the source driver latches 530*a*-530*c* where it is subsequently latched for a remaining portion of the first scan line period by a source driver latch signal S_LATCH (also not shown in FIG. 5). Accordingly, during the first scan line period, the image data X1Y1, X2Y1, and X3Y1 is provided to source driver latches 530*a*-530*c* and thereby to source driver 520(*i*). Also during the first scan line period a first latch signal F_LATCH latches the image data X1Y4 from the fourth column of GRAM cells 510.

During a second scan line (or row) period, data in the second row of GRAM cells 510 is output by the GRAM device. In response to the MUX_SELECT signal and the rising edge of SCK, each of MUXs 546*a*-546*c* selects the image data input on line D0 from one of the first three columns of GRAM cells 510 and provides the selected data to a corresponding one of the source driver latches 530*a*-530*c* where it is subsequently latched for a remaining portion of the second scan line period by the source driver latch signal S_LATCH. Accordingly, during the second scan line period, the image data X1Y2, X2Y2, and X3Y2 is provided to source driver latches 530*a*-530*c* and thereby to source driver 520(*i*). Also during the second scan line period, first latch signal F_LATCH latches the image data X2Y4 from the fourth column of GRAM cells 510.

Next, during a third scan line (or row) period, data in the third row of GRAM cells 510 is output by the GRAM device. In response to the MUX_SELECT signal and the rising edge of SCK, each of MUXs 546*a*-546*c* selects the image data input on line D0 from one of the first three columns of GRAM cells 510 and provides the selected data to a corresponding one of the source driver latches 530*a*-530*c* where it is subsequently latched for a remaining portion of the third scan line period by the source driver latch signal S_LATCH. Accordingly, during the third scan line period, the image data X1Y3, X2Y3, and X3Y3 is provided to source driver latches 530*a*-530*c* and thereby to source driver 520(*i*). Also during the third scan line period, first latch signal F_LATCH latches the image data X3Y4 from the fourth column of GRAM cells 510.

Finally, during a fourth scan line (or row) period, no data is output by the GRAM device. Furthermore, no SCK pulse is present during the fourth scan line period. The MUX-SELECT signal has an opposite logic state as it did during the first, second and third scan line periods. In response to the MUX_SELECT signal, each of MUXs 546*a*-546*c* selects the image data input on line D1 from one of the three first latches 544*a*-544*c* and provides the selected data to a corresponding one of the source driver latches 530*a*-530*c* where it is subsequently latched for a remaining portion of the fourth scan line period by the source driver latch signal S_LATCH. Accordingly, during the fourth scan line period, the image data X1Y4, X2Y4, and X3Y4 is provided to source driver latches 530*a*-530*c* and thereby to source driver 520(*i*).

Thus, during the first through fourth scan line periods, source driver latch 530*a* receives in sequence the data X1Y1, X1Y2, X1Y3 and X1Y4. Similarly, during the first through fourth scan line periods, source driver latch 530*b* receives in sequence the data X2Y1, X2Y2, X2Y3 and X1Y4, and source driver latch 530*c* receives in sequence the data X3Y1, X3Y2, X3Y3 and X3Y4. Accordingly, memory remapping circuit 540 remaps a*y rows by b*x columns of image data in GRAM 510 to b*y rows by a*x columns of pixels.

Although the specific embodiments described in the figures above describe cases where b*y rows and a*x columns of external addresses are mapped to a*y rows and b*x columns of physical memory addresses where b=a+1, and then remapped back again, in general the principles may be extended to a case where b=a+j, where j can be any integer greater than or equal to 1, that is, where b>a.

Also, although the embodiments described above pertained to DDIs where the graphics memory device is GRAM, the principles are extendable to other graphics memory devices in a DDI, such as FLASH memory devices. Furthermore, in some embodiments, the source drivers may be provided externally to the DDI.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the scope of the appended claims.

We claim:

1. A method of providing image data to source drivers for a display device comprising b*y rows and a*x columns of pixels, where b>a, the method comprising:

receiving image data for b*y rows of pixels of the display device, the image data for each of the b*y rows of pixels including image data for each of the a*x columns of pixels of the display device;

storing the image data for the b*y rows of pixels including image data for each of the a*x columns of pixels of the display device into a*y rows of memory cells including b*x columns of memory cells in a graphics memory device, wherein each of the a*y rows of memory cells in the graphic memory device stores image data for an entire one of the b*y rows of pixels of the display device, and further stores image data for x columns of each of (b−a) other rows of pixels of the display device; and sequentially supplying the image data for each of the b*y rows of pixels of the display device from the graphic memory device to the source drivers, where a, b, x and y are positive integers, wherein sequentially supplying the image data for each of the b*y rows of pixels the display device from the graphic memory device to the source drivers comprises:

(a) supplying the image data for an $((a+j)*i+1)^{th}$ one of the b*y rows of pixels the display device, from an $((a*i)+1)^{th}$ of the a*y rows of memory cells in the graphic memory device to the source drivers, where j=(b−a);

(b) supplying the image data for a next one of the b*y rows of pixels the display device, from a next one of the a*y rows of memory cells in the graphic memory device to the source drivers;

(c) repeating step (b) until image data for a total of a rows of pixels of the display device have been supplied from the graphic memory device to the source drivers;

(d) subsequent to steps (a) through (c), sequentially supplying to the source drivers image data for an $((a+n)*(i+1))^{th}$ one of the b*y rows of pixels the display device for all n where 1≤n≤j; and (e) repeating steps (a) through (d) for all i, where 0≤i≤(y−1), where i and j are positive integers.

2. The method of claim 1, wherein supplying to the source drivers image data for the $((a+n)*(i+1))^{th}$ one of the b*y rows of pixels the display device, comprises supplying (b−a)*x columns of image data for the $((a+n)*(i+1))^{th}$ row of the display device from each of a preceding a rows of memory cells in the graphic memory device.

3. The method of claim 1, wherein step (a) comprises:

(i) providing image data from a*x memory cells in the $((a*i)+1)^{th}$ row of memory cells in the graphic memory device to the source drivers during an $((a+j)*i+1)^{th}$ scan line period; and (ii) latching image data from x memory cells in the $((a*i)+1)^{th}$ row of memory cells in the graphic memory device using first latches during the $((a+j)*i+1)^{th}$ scan line period, where i and j are positive integers.

4. The method of claim 3, wherein step (b) comprises:

(i) latching image data from a*x memory cells in the next row of memory cells in the graphic memory device using source driver latches during a next scan line period; and (ii) latching image data from x memory cells in the next row of memory cells in the graphic memory device using first latches during the next scan line period.

5. The method of claim 3, wherein step (d) comprises:

providing the latched image data from the $((a*i)+1)^{th}$ row through the $(a*(i+1))^{th}$ row of memory cells in the graphic memory device to the source drivers during an $((a+j)*(i+1))^{th}$ scan line period.

6. The method of claim 1, wherein the image data is n-bit data, where n>1.

7. The method of claim 1, wherein (b−a)=1.

8. The method of claim 1, wherein (b−a)>1.

* * * * *